May 23, 1961          R. W. KETCHLEDGE          2,985,808
PULSE LENGTH CONTROLLED SERVO SYSTEM
Filed Dec. 2, 1959
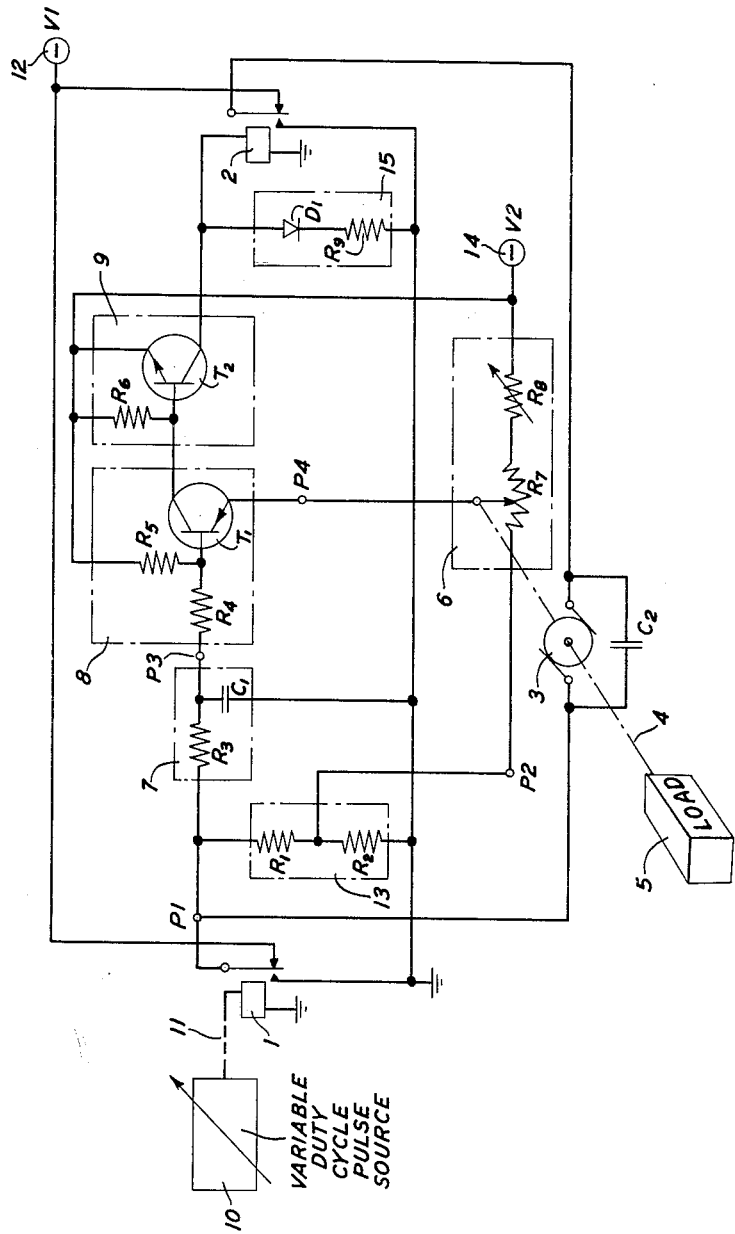
INVENTOR
R. W. KETCHLEDGE
BY
Kenneth B. Hamlin
ATTORNEY

United States Patent Office 2,985,808
Patented May 23, 1961

2,985,808
PULSE LENGTH CONTROLLED SERVO SYSTEM

Raymond W. Ketchledge, Whippany, N.J., assignor to Bell Telephone Laboratories, Incorporated, New York, N.Y., a corporation of New York Filed Dec. 2, 1959, Ser. No. 856,749
13 Claims. (Cl. 318—28)

This invention relates to servo systems and more particularly to pulse controlled servo systems.

Servo systems are fundamentally feedback control systems for controlling a source of power in which the output (or some function thereof) is fed back and compared to some reference at the input and the difference of this comparison is used to effect the desired control.

One type of servo system known generally as a pulse proportional control servo system utilizes the variable duty cycle of a pulse operated relay to operate an electrical motor. In this type of servo system the shaft of the motor is centered by a mechanical spring which is used to convert the variable torque of the motor into a variable shaft position. Although widely used, this type of servo system has a number of distinct disadvantages. For example, because of the spring biasing of the motor shaft only a small fraction of the motor power is available to the load. Additionally, the drain on the power supply is continuous because the motor is continuously energized. Furthermore, the power supply must be larger than that required by the load alone. Another disadvantage of this type of system is that the load is subjected to a continuous hunting motion which results in excessive mechanical wear.

It is an object of the present invention to provide an improved servo system wherein the above-described disadvantages are eliminated or substantially reduced.

Further specific objects of the present invention are to reduce the over-all power requirements in a servo system, to reduce the continuous drain on the power supply in a servo system, to reduce undesired hunting motion of the load and hence to reduce the mechanical wear in a servo system, and to reduce the over-all size and weight of a servo system.

Additional objects of the present invention are to increase the speed of response, the precision of control, and the reliability of a servo system, and to increase the power available to the load from the motor of a servo system.

The foregoing and other objects of the present invention are attained in an illustrative embodiment thereof comprising a pair of relays, a control motor the shaft of which is connected to the load to be controlled, a smoothing filter, a voltage comparison circuit, and a feedback circuit. A first of the two relays is pulsed by pulses from a variable duty cycle pulse source. Voltage pulses generated when the first relay is successively operated and released are applied to the smoothing filter which provides an output voltage indicative of the relative dwell time of the armature and contacts of the first relay. This voltage is applied as one input to the comparison circuit. The feedback circuit applies a second voltage to the comparison circuit which is indicative of the relative rotational position of the motor shaft. When the two voltages applied to the comparison circuit are balanced, the second of the two relays is pulsed in synchronism with the first relay and no drive current is applied to the motor. However, when the two voltages are unbalanced the comparison circuit controls the operation of the second relay. Depending upon the direction of the unbalance, the second relay is either operated to close at its front contact or released and closed at its back contact. With the second relay operated or released, current pulses are applied to the motor in response to the pulsing of the first relay. The motor then operates in a step-by-step fashion in response to these current pulses until the feedback voltage applied to the comparison circuit is balanced with the voltage obtained from the smoothing filter. When this balance occurs the second relay pulses in synchronism with the first relay, no current pulses are applied to the motor, and the step-by-step rotation of the motor is halted. The control of the load connected to the motor shaft is effected by varying the duty cycle operation of the first relay to provide an unbalance in a desired direction between the output voltage from the smoothing filter and the feedback voltage.

It is a feature of the present invention that the motor of a servo system be energized in a step-by-step manner to effect the controlled movement of the load attached thereto.

It is a further feature of the invention that the motor of a servo system be energized only while the controlled movement of the load attached thereto is being effected.

It is also a feature of the invention that the relative dwell time of the armature and contacts of a pulse operated relay of a servo system be converted into stationary mechanical positions of a motor shaft and be utilized to control the step-by-step rotation of the motor shaft to a desired position.

It is a further feature of the invention that a motor and a pair of relays be connected in circuit with a source of power in a servo system such that the synchronous pulsing of both relays removes all power from the motor and the nonsynchronous pulsing of the relays energizes the motor in a step-by-step manner to effect the controlled step-by-step movement of the load attached to the motor shaft.

It is an additional feature of the invention that a servo sysem include a pair of relays, a control motor, a smoothing filter, a voltage comparison circuit, and a feedback circuit, that the first of the two relays be pulsed from a variable duty cycle pulse source, that a voltage indicative of the relative dwell time of the armature and contacts of the first relay be compared in the comparison circuit with a voltage obtained from the feedback circuit which is indicative of the relative rotational position of the motor shaft, that when the two voltages are unbalanced the relays be operated to apply current pulses to the motor to rotate it in a step-by-step fashion in a direction to eliminate the unbalance and that when the two voltages are balanced that the relays be pulsed in synchronism to remove the current pulse from the motor and halt its step-by-step rotation.

The foregoing and other objects and features of the present invention will be more readily understood from the following description when read with reference to the accompanying drawing, the single figure of which discloses an illustrative embodiment of the invention.

Referring now to the drawing, the illustrative embodiment of the servo system in accordance with the principles of the invention comprises relay 1, relay 2, and motor 3 connected to load 5 by shaft 4. Shaft 4 of motor 3 is also connected to the movable arm of potentiometer R7 which together with variable resistance R8 comprises a feedback circuit 6 of the servo system. The illustrative embodiment further comprises a smoothing filter 7, comparator 8, and current amplifier 9.

Relays 1 and 2 are relays of the type well known in the art which have an armature, a front contact and a back contact. Relay 1 is the input relay of the servo system of the present invention, and the relative dwell time of the armature and contacts thereof is utilized in accordance with my invention to effect the controlled movement of load 5. Relay 1 is continuously operated and released in response to variable duty cycle signal pulses received from variable duty cycle pulse source 10 via transmission path 11. The servo system of the present invention may advantageously be remotely controlled from a distant location in which event transmission path 11 may comprise a wire transmission path or a radio transmission path. Alternatively, relay 1 in the servo system of the present invention may be locally controlled by connecting variable duty cycle pulse source 10 directly to relay 1 by an electrical conductor.

Referring to the drawing, it will be noted that motor 3 is connected in series between the respective armatures of relays 1 and 2, that the back contacts (break contacts) of relays 1 and 2 are connected to a source 12 of negative voltage V1, and that the front contacts (make contacts) of relays 1 and 2 are connected to ground potential. Hence, at the instant that realys 1 and 2 are both in the normal condition as shown in the drawing there will be no difference of potential applied across motor 3. Similarly, if both relays 1 and 2 are in the operated condition at the same instant, no difference of potential will be applied across motor 3. Accordingly, it is apparent that if relays 1 and 2 are pulsed in synchronism no driving current will be applied to motor 3. However, if relays 1 and 2 are operated nonsynchronously a difference of potential will be developed across motor 3 and current pulses will be applied thereto to drive the motor in a step-by-step manner in a clockwise or counterclockwise direction as will be described hereinafter. Condenser C2, shunted across motor 3, is a bypass condenser to reduce radio interference.

As indicated above, relay 1 is continuously operated and released in response to the variable duty cycle signal pulses received from pulse source 10, and hence the armature of relay 1 oscillates between its front and back contacts which are connected respectively to ground and to source 12 of negative potential V1. Thus as relay 1 is pulsed in response to the signal pulses from pulse source 10 a rectangular voltage wave will be applied from the armature of relay 1 to point P1 in the servo circuit of the present invention. The amplitude of this rectangular voltage wave varies between ground and −V1 volts and the duty cycle will correspond to the relative dwell time of the armature and contacts of relay 1 which in turn corresponds to the duty cycle of the signal pulses from pulse source 10.

The rectangular voltage wave developed at point P1 is applied across a voltage divider 13 comprising resistances R1 and R2 which in turn applies a smaller amplitude rectangular voltage wave to point P2. This smaller rectangular wave at point P2 will be utilized in the manner described hereinafter to control the pulsing of realy 2 in synchronism with the pulsing of realy 1 or to control the step-by step energization of motor 3.

The rectangular voltage wave developed at point P1 is also applied to the smoothing filter 7 comprising resistance R3 and condenser C1 and produces, across condenser C1 at point P3 a direct-current voltage corresponding to the relative dwell time of the armature and contacts of relay 1. The voltage developed across condenser C1 in filter 7 is the average voltage of the rectangular voltage wave developed at point P1 and is applied at point P3 as a reference signal voltage input to comparator 8. It is apparent that as the dwell time of the armature and back contact of relay 1 is increased, a greater negative voltage will be developed across condenser C1 in the filter 7 and, conversely, as the dwell time of the armature and back contact of realy 1 is decreased a smaller negative voltage will be developed across condenser C1. Thus the reference signal developed at point P3, as an input to comparator 8, will be a negative direct-current voltage corresponding to the duty cycle of the input signal pulses from pulse source 10 and the relative dwell time of the armature and contacts of relay 1. As described hereinafter, this reference signal voltage will be compared with a feedback voltage in comparator 8 to effect the step-by-step energization of motor 3 and the controlled movement of load 5.

Feedback circuit 6, which includes variable resistance R8 and potentiometer R7, develops a feedback voltage at point P4 of the servo circuit of the present invention which corresponds to the relative rotational position of shaft 4 of motor 3. As shown, feedback circuit 6 is connected to source 14 of negative voltage V2, and because the movable arm of potentiometer R7 is attached to and controlled by shaft 4 of motor 3, the feedback voltage applied at point P4 will correspond to the position of shaft 4 of motor 3.

The voltage at point P4 also includes another component, namely a rectangular voltage wave component developed at point P2 from the output of voltage divider 13. As indicated hereinbefore, this rectangular voltage wave is a proportion of the rectangular voltage wave developed at point P1. It will be observed that when relay 1 is in its operated condition, point P1 and accordingly point P2 will be at substantially ground potential. When relay 1 is in its released condition, point P1 will be at −V1 volts and point P2 will be at a lesser negative potential depending upon the ratio of resistances R1 and R2 of voltage divider 13. Assume, for example, that source 12 is a negative 3 volt source and that ratio of resistances R1 and R2 is such that a potential of −⅓ of a volt is developed at point P2. Then, under these assumed conditions, the left-hand terminal of potentiometer R7 of feedback circut 6 alternates between substantially ground potential and negative potential of −⅓ of a volt in response to the pulsing of relay 1. Accordingly, the voltage developed at point P4 alternates between the feedback voltage developed across potentiometer R7 and resistance R8 and a potential less negative than this voltage by ⅓ of a volt as relay 1 pulses.

As shown in the drawing, comparator 8 comprises a P-N-P transistor T1, the base electrode of which is connected through resistance R4 to point P3, the emitter electrode of which is connected to point P4, and the collector electrode of which is connected to the input of amplifier 9. Thus the reference signal voltage developed at point P3 is applied to the base of transistor T1 in comparator 8 through resistance R4. The voltage at point P4 which includes the rectangular voltage wave component at point P2 and the feedback voltage developed across potentiometer R7 and resistance R8 is applied to the emitter electrode of transistor T1. The emitter-base junction of transistor T1 is therefore driven by three signals, the small rectangular voltage wave at point P2, the direct-current reference signal voltage developed at point P3, and the feedback voltage. The reference signal voltage at point P3 and the feedback component of the voltage at point P4 are advantageously adjusted by means of proper selection of the circuit components such that transistor T1 will be placed in its nonconducting condition without regard to the rectangular voltage wave at point P2. The signal component of the voltage at point P4 which corresponds to the rectangular voltage wave at point P2 thus, in effect, raises the emitter electrode of transistor T1 positive with respect to its base electrode such that the transistor T1 will switch to its conducting condition in response to each positive excursion of the rectangular voltage wave at point P2 and will return to its nonconducting condition in response to each negative excursion of the rectangular voltage wave at point P2. Thus, if the reference signal voltage developed at point P3 corresponding to the duty cycle of the incoming signal pulses from source 10 balances against the feedback voltage developed at point P4, transistor T1 will switch between its conducting and non-conducting states in response to the rectangular voltage wave at point P2. On the other hand, should there be an unbalanced condition between the reference signal voltage at point P3 and the feedback voltage at point P4, transistor T1 will be held in its conducting condition or its nonconducting condition depending upon the direction of unbalance. For example, assume that the feedback voltage at point P4, which corresponds to the rotational position of shaft 4 of motor 3, is negative with respect to the reference signal voltage at point P3 to such an extent that the positive excursions of the rectangular voltage wave at point P4 corresponding to the rectangular voltage wave at point P2 are of insufficient magnitude to raise the emitter-base junction bias of transistor T1 above cut-off. When this condition of unbalance occurs transistor T1 will be held in its nonconducting condition. Alternatively, assume that the feedback voltage at point P4 is positive with respect to the reference signal voltage at point P3 to such an extent that the negative excursions of rectangular voltage wave at point P4 are of insufficient magnitude to reduce the emitter-base junction bias of transistor T1 below cut-off. When this condition of unbalance occurs transistor T1 will be held in its conducting condition. Whether transistor T1 in comparator 8 conducts or not is determined by the sum of the three signals as described above.

Resistances R4 and R5 in comparator 8 form a direct-current voltage shifting network which biases transistor T1 such that in extreme duty cycles producing very little voltage across condenser C1 in smoothing filter 7 transistor T1 will still be able to switch to its conducting condition in response to the rectangular voltage wave at point P2 when the movable arm of potentiometer R7 is moved toward the extreme left-hand end, that is the end connected to point P2. Variable resistance R8 may advantageously be utilized as an adjustment of a neutral or load center position in that it determines the amount of feedback voltage developed at point P4. Furthermore, variable resistance R8 also advantageously serves as a sensitivity adjustment in that it provides a control of the amount of movement of load 5 for a given duty cycle change.

The current flowing through transistor T1 of comparator 8 when transistor T1 is in its conducting state is advantageously maintained at a low value so as to keep the impedances high and thereby reduce the loading of transistor T1 on the signal source. Amplification is therefore required to amplify this current to the level required for the operation of relay 2. This is accomplished as shown in the drawing by amplifier 9 which comprises N-P-N transistor T2, the base electrode of which is connected to the collector electrode of transistor T1 in comparator circuit 8, the emitter electrode of which is connected to source 14 of negative voltage V2, and the collector electrode of which is connected through the winding of relay 2 to ground. Resistance R6 connected between the base electrode of transistor T2 and source 14 of negative voltage V2 advantageously prevents leakage currents through transistor T1 from affecting transistor T2. When transistor T1 of comparator 8 is in its conducting state the base electrode of transistor T2 will be biased positive with respect to its emitter electrode and transistor T2 will conduct and amplify the current flowing through transistor T1 to a level sufficient to operate relay 2.

Network 15 comprising diode D1 and resistor R9 is connected between the collector electrode of transistor T2 and ground to limit inductive surge voltages across the winding of relay 2. Network 15 thus protects transistors T1 and T2 from the inductive surge voltages which result when current is removed from relay 2. The ohmic value of resistance R9 is such as to allow sufficient voltage to appear across the winding of relay 2 to prevent its slow release.

The controlled movement of load 5 is effected in accordance with the invention by establishing an unbalance between the reference signal voltage at point P3 and the feedback voltage at point P4, which unbalance causes the servo system of the present invention to move load 5 automatically in a step-by-step manner to a desired position. As indicated hereinbefore, the reference signal voltage at point P3 is a direct-current voltage corresponding to the relative dwell time of the armature and contacts of relay 1 and hence may be altered by changing the duty cycle operation of relay 1. Therefore the reference signal voltage applied at point P3 may be selectively controlled by control of the duty cycle of the signal pulses applied from pulse source 10 to relay 1. When the duty cycle of these signal pulses is changed in one direction, an unbalance between the reference signal voltage at point P3 and the feedback voltage at point P4 will be established such as to cause current pulses to be applied to motor 3 in a direction to eliminate this unbalance. This will also result in the controlled movement of load 5 to a desired position. For example, if this unbalance results in relay 2 being released as described above, a negative potential of V1 volts will be applied from source 12 through the armature and back contact of relay 2 to the right-hand terminal of motor 3. Accordingly, each time that relay 1 operates in response to a signal pulse from source 10, ground will be applied through the armature and front contact of relay 1 to the left-hand terminal of motor 3 and a current pulse will be applied to motor 3 to cause it to rotate shaft 4 one incremental step. Each incremental rotation of shaft 4 causes a corresponding change in the feedback voltage applied at point P4. This step-by-step energization of motor 3 and the step-by-step movement of load 5 connected to shaft 4 of motor 3 continues in response to the successive signal pulses from source 10 until the feedback voltage at point P4 balances with the reference signal voltage at point P3.

Similarly, if the reference signal voltage at point P3 is changed by a change of duty cycle operation of relay 1 in the opposite direction from that assumed above, current pulses of opposite polarity to those described above will be applied to motor 3 to drive it in a step-by-step manner in the opposite direction to eliminate the unbalance. As shaft 4 of motor 3 is rotated in the step-by-step manner in this direction, load 5 is also moved to a desired position.

Once the balanced condition is re-established, transistor T1 of comparator 8 will switch from its non-conducting to its conducting state and vice versa in response to each positive and negative excursion respectively of the rectangular voltage wave at point P2 and will cause relay 2 to be pulsed in synchronism with relay 1. As indicated hereinbefore, this removes the driving power from motor 3. In this manner the controlled movement of load 5 is positive and has no inherent overshoot which might cause a hunting motion of load 5. As long as a balanced condition is maintained between the reference signal voltage at point P3 and the feedback voltage at point P4, no power is applied to motor 3 and hence motor 3 is not draining power from source 12. When an unbalanced condition between the reference signal voltage at point P3 and the feedback voltage at point P4 is established, as described above, current pulses are applied to motor 3 to correct this unbalance and the motor is pulsed in a step-by-step manner until the balanced condition is re-established, at which time relays 1 and 2 are pulsed in synchronism and the driving power applied to motor 3 is removed.

It is to be understood that the above-described arrangement is illustrative of the principles of the invention. Numerous other arrangements may be devised by those skilled in the art without departing from the spirit and scope of the invention.

What is claimed is:

1. In a servo system responsive to variable duty cycle control pulses, the combination comprising a relay responsive to said control pulses, means controlled by said relay for generating a reference signal indicative of the duty cycle of said control pulses, a motor having a shaft, means connected to said shaft for generating a feedback signal indicative of the relative rotational position of said shaft, means for comparing said reference signal and said feedback signal, and means controlled by said comparing means and including said relay for applying current pulses to said motor to rotate said shaft in a step-by-step manner to a predetermined rotational position.

2. The combination defined in claim 1 further comprising means controlled by said comparing means operable when said reference signal and said feedback signal have a predetermined relationship for removing said current pulses from said motor to halt the step-by-step rotation of said shaft.

3. In a servo system responsive to variable duty cycle control pulses, the combination comprising a first relay responsive to said control pulses, said first relay having an armature, a front contact and a back contact, a second relay having an armature, a front contact and a back contact, a reversible motor having a shaft for controlling the position of a load, said motor being electrically connected between the respective armatures of said first and said second relay, a source of voltage, means connecting one of said contacts of each of said relays to said source of voltage, means connecting ground potential to the other of said contacts of each of said relays, means connected to said shaft for generating a feedback voltage indicating the relative rotational position of said shaft, means controlled by said first relay for generating a reference voltage corresponding to the relative dwell time of the armature on the contacts of said first relay, and means jointly responsive to said feedback voltage and said reference voltage for pulsing said second relay in synchronism with said first relay to remove said voltage of said source from said motor.

4. The combination defined in claim 3 wherein said last named means comprises a transistor having base, emitter and collector electrodes, means for applying said reference voltage to said base, means for applying said feedback voltage to said emitter, and means connecting said second relay to said collector.

5. The combination defined in claim 4 further comprising means controlled by said first relay for applying a rectangular voltage wave to said emitter to control the pulsing of said second relay in synchronism with said first relay.

6. The combination defined in claim 3 further comprising means operable when said reference voltage and said feedback voltage have a predetermined relationship for applying voltage pulses from said source to said motor to rotate said shaft in a step-by-step manner to a predetermined rotational position.

7. In a servo system the combination comprising a source of control pulses, a relay responsive to said pulses, said relay having an armature and at least one contact, means controlled by said relay for generating a reference voltage the magnitude of which corresponds to the relative dwell time of said armature on said contact, a motor having a shaft for controlling the position of a load, and means responsive to said reference voltage for applying current pulses to said motor to rotate said shaft in a step-by-step manner to a predetermined rotational position.

8. The combination defined in claim 7 further comprising means for selectively changing the magnitude of said reference voltage to selectively change the rotational position of said shaft, said means comprising means for selectively controlling the duty cycle of said control pulses.

9. In a servo system responsive to variable duty cycle control pulses, the combination comprising a relay having an armature and at least one contact, and responsive to said control pulses, means controlled by said relay for generating a reference voltage the magnitude of which corresponds to the relative dwell time of said armature on said contact, a motor having a shaft, means connected to said shaft for generating a feedback voltage the magnitude of which corresponds to the relative rotational position of said shaft, a source of driving power for said motor, means for comparing said reference voltage and said feedback voltage, means controlled by said comparing means operable when said reference voltage and said feedback voltage have a predetermined relationship for removing said driving power from said motor, and means controlled by said comparing means operative when reference voltage and said feedback voltage have a relationship other than said predetermined relationship for applying current pulses from said source to said motor to rotate said shaft in a step-by-step manner in the direction required to establish said perdetermined relationship between said feedback voltage and said reference voltage.

10. The combination defined in claim 9 wherein said means controlled by said comparing means includes a second relay, said second relay being pulsed in synchronism with said first relay when said reference voltage and said feedback voltage have said predetermined relationship and said second relay being operable to a first condition when the ratio of said reference voltage to said feedback voltage is greater than said predetermined relationship and to a second condition when the ratio of said reference voltage to said feedback voltage is less than said predetermined relationship to control the direction of the step-by-step rotation of said shaft.

11. The combination defined in claim 9 wherein said comparing means comprises a transistor having base, emitter and collector electrodes, means applying said reference voltage to said base electrode, and means applying said feedback voltage to said emitter electrode, and wherein said means controlled by said comparing means includes current amplifying means connected to said collector electrode.

12. In a servo system the combination comprising a rectangular voltage wave source, means for varying the duty cycle of said wave, means responsive to said wave for generating a direct-current reference voltage the magnitude of which corresponds to the average voltage of said wave, a motor having a shaft, means connected to said shaft for generating a feedback voltage the magnitude of which corresponds to the relative rotational position of said shaft, means for comparing said reference voltage and said feedback voltage, means controlled by said comparing means for energizing said motor in a step-by-step fashion to rotate said shaft to a predetermined rotational position, and means controlled by said comparing means operable when said shaft is rotated to said predetermined position to remove said current pulses from said motor.

13. In a servo system responsive to variable duty cycle control pulses, the combination comprising a first relay responsive to said control pulses, said first relay having an armature, a front contact and a back contact, a second relay having an armature, a front contact and a back contact, a reversible motor having a shaft for controlling the position of a load, said motor being electrically connected between the respective armatures of said first and said second relays, a source of voltage, means connecting one of said contacts of each of said relays to said source of voltage, means connecting ground potential to the other of said contacts of each of said relays, means connected to said shaft for generating a feedback voltage corresponding to the relative rotational position of said shaft, means controlled by said first relay for producing a reference voltage the magnitude of which corresponds to the relative dwell time of said armature and said contacts of said first relay, means for comparing said reference voltage and said feedback voltage, means controlled by said comparing means for controlling the operation of said second relay, said last named means operable in response to a predetermined ratio between said reference voltage and said feedback voltage to operate said second relay in synchronism with said first relay to remove said voltage of said source from said motor and said last named means controlled by said comparison means to maintain said second relay in its released condition when the ratio of said reference voltage to said feedback voltage is less than said predetermined ratio and to maintain said second relay in its operated condition when the ratio of said reference voltage to said feedback voltage is greater than said predetermined ratio to apply voltage pulses of a first polarity or a second polarity respectively to said motor in response to the pulsing of said first relay.

No references cited.